350-96.15 SR
1/23/79 OR 4,135,779

United States Patent [19] [11] 4,135,779
Hudson [45] Jan. 23, 1979

[54] VARIABLE RATIO OPTICAL JUNCTION DEVICE

[75] Inventor: Marshall C. Hudson, Corning, N.Y.

[73] Assignee: Corning Glass Works, Corning, N.Y.

[21] Appl. No.: 711,104

[22] Filed: Aug. 2, 1976

[51] Int. Cl.² ................................................ G02B 5/14
[52] U.S. Cl. ............................... 350/96.15; 350/96.20
[58] Field of Search ..................................... 350/96 C

[56] References Cited

U.S. PATENT DOCUMENTS 3,983,389 9/1976 Cowardin et al. ............ 350/96 C X

FOREIGN PATENT DOCUMENTS 2016498 10/1971 Fed. Rep. of Germany ........ 350/96 C
2034344 1/1972 Fed. Rep. of Germany ........ 350/96 C
2408623 9/1975 Fed. Rep. of Germany ........ 350/96 C

*Primary Examiner*—John K. Corbin
*Assistant Examiner*—Rolf Hille
*Attorney, Agent, or Firm*—William J. Simmons, Jr.; Walter S. Zebrowski; Clarence R. Patty, Jr.

[57] ABSTRACT

An optical fiber junction device for coupling a pair of optical fibers with a third optical fiber. A portion of the cladding is etched from the end portions of the pair of fibers, and those end portions are then secured together in side-by-side relationship so that their endfaces are coplanar. The third fiber is so disposed that the end portion thereof is substantially parallel to the end portions of the pair of fibers, and its endface is adjacent to the endfaces of the pair of fibers. Means is provided for causing lateral movement between the endfaces of the pair of fibers and that of the third fiber to vary the amount of light coupled between the pair of fibers and the third fiber.

3 Claims, 7 Drawing Figures 22 36 30 32 28 24 26 38 34

VARIABLE RATIO OPTICAL JUNCTION DEVICE

BACKGROUND OF THE INVENTION

This invention relates to variable optical junction devices for joining a single optical waveguide fiber with two optical waveguide fibers.

This invention is primarily concerned with the dividing and/or combining of light propagating in optical fibers for effecting distribution of light between a number of discrete paths or collection of light from multiple paths into a single path.

Optical waveguides, which are a promising transmission medium for optical communication systems, normally consist of an optical fiber having a core of transparent material having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 issued to R. D. Maurer et al. discloses a low loss optical waveguide comprising a cladding layer of fused silica and a core of fused silica doped with one or more materials that selectively increase the index of refraction of the core above that of the cladding. Other known optical waveguide structures include multiclad fibers and fibers having a gradient refractive index.

In optical communication systems using optical waveguides there are many occasions when it is useful to distribute the optical signal propagating in a single waveguide into two or more waveguides. Conversely, there are occasions when optical signals propagating in two or more waveguides need to be coupled into a single waveguide. In such systems it may be desirable to couple different fractions of the signal from the input fiber to the two output fibers. It may also be beneficial to change the coupling ratio during the system installation in order to achieve a specified performance or change the coupling ratio at a later time to adjust for system updates or additions.

A variable ratio coupler is disclosed in U.S. Pat. No. 3,874,779 issued to F. L. Thiel. The coupler disclosed in that patent is disposed between two sections of optical signal transmission line for extracting from one of the sections a fraction of the energy transmitted thereby. The coupler comprises first and second 45° right prisms which are so disposed that the large area planar surfaces thereof are slightly spaced and are parallel. Disposed between the prisms is a sheet of transparent material having a refractive index lower than the refractive indices of the prisms. The transparent sheet is slideably disposed between the two prisms so that it can be replaced by another sheet having a different refractive index. Input light from one of the sections of trasmission line is coupled to one of the prisms and impinges upon the prism-sheet interface at such an angle that a fraction of the input light reflects from the interface and is thus extracted from the optical signal transmission line. The remainder of the input light passes through the sheet of transparent material into the second prism, and after propagating therethrough, is coupled to the second section of optical signal transmission line. Couplers of this type exhibit an insertion loss at each interface between an optical signal transmission line and the adjacent transparent prism. Furthermore, when one transparent sheet is replaced by another sheet to change the coupling ratio, the ratio of light coupled to the two output transmission lines is not continuously variable.

SUMMARY OF THE INVENTION

It is therefore an object of the present invention to provide an optical fiber junction device which overcomes the disadvantages of the prior art.

Another object is to provide an optical fiber junction device which is suitable for use in optical communication systems employing single fiber channels.

Briefly, the present invention relates to a variable optical junction device for coupling a first optical fiber with a pair of optical fibers. The coupler comprises means for maintaining the end portions of the pair of fibers in parallel contacting relationship, the endfaces of these fibers being substantially coplanar. Means is provided for supporting the end portion of the other optical fiber so that its axis is substantially parallel with the axes of the pair of fibers and its endface is disposed against the endfaces of the pair of fibers. Means is provided for causing relative movement between the endfaces of the pair of fibers and the other fiber, this movement causing the center of the other fiber to traverse a line passing through the centers of the pair of fibers.

DETAILED DESCRIPTION

Figure 1:
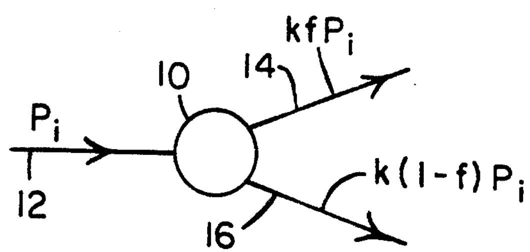
FIG. 1 is a schematic diagram of the junction device of the present invention.

A schematic diagram for the optical junction device of the present invention is shown in FIG. 1. Junction device 10 couples fiber 12 to fibers 14 and 16. This schematic diagram is used to illustrate the coupling of light from the first fiber to the pair of fibers, it being apparent that light from the pair of fibers 14, 16 can be coupled by the junction device to fiber 12. Input signal $P_i$ propagating in fiber 12 is divided into two parts, $fP_i$ and $(1-f)P_i$, which initiate the propagation of light in fibers 14 and 16, respectively. The signal loss which is encountered in such a device is termed insertion loss. The sum of the output signals from fibers 14 and 16 divided by the input signal $P_i$ defines the fractional loss $k$, assuming that the lengths of the fibers is sufficiently short that the light suffers negligible transmission loss therein. Insertion loss is usually expressed in decibels by the definition, $-10 \log_{10} k$.

Figure 2:
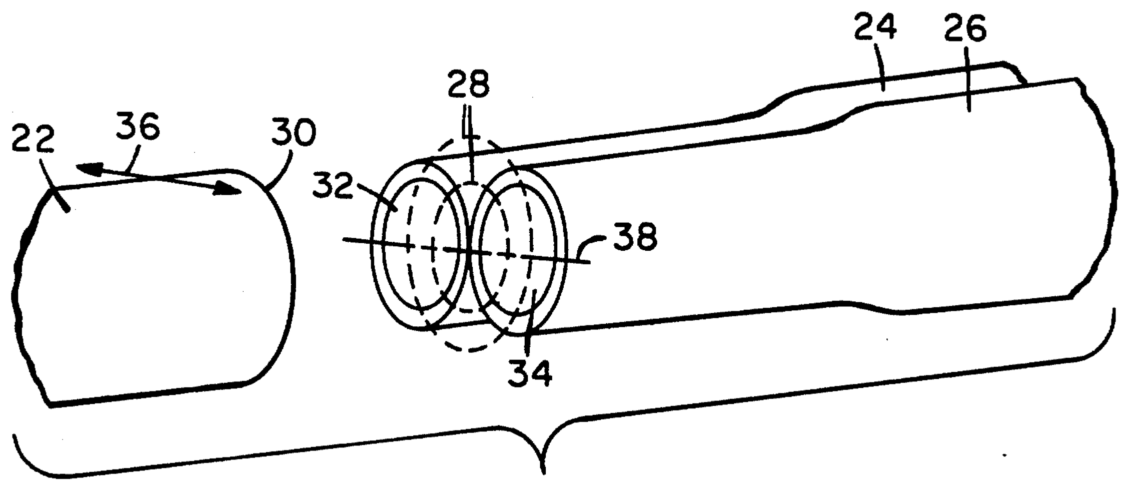
FIG. 2 is an exploded oblique view illustrating the basic principles of the present invention.

FIG. 2 is an exploded view illustrating the principle of the present invention. A fiber 22 is so disposed with respect to fibers 24 and 26 that its endface 30 is disposed adjacent to endfaces 32 and 34. Dashed lines 28 illustrate the location of the core and cladding of fiber 22 after it is moved into its proper position.

The insertion loss of the optical junction device can be lowered by etching some or all of the cladding from the end portions of fibers 24 and 26. This can be accomplished in the manner described in U.S. Pat. No. 3,912,362 issued to me on Oct. 14, 1975. It can be seen that the core of fiber 22 encompasses a greater area of the cores of fibers 24 and 26 when the cladding of these latter mentioned fibers is reduced in thickness. It is noted that the end portion of fiber 22 need not be etched since no reduction in insertion loss is achieved thereby.

An important consideration in making good low loss connections between optical fibers is the quality of the fiber endfaces, a clean and relatively flat endface being preferred. The fiber endfaces may be ground and polished, or it may be sufficient to merely break the fibers by well known techniques. For example, the fiber endfaces may be prepared by scoring, stressing and bending as discussed by E. L. Chinnock et al. in their publication entitled "Optical Fiber End Preparation for Low-Loss Tape Splices," Bell System Technical Journal, Vol. 54, March 1975, pp. 471–477. Prior to preparing the end portions of the fibers, any coating thereon may be removed. Conventional plastic coatings, which are applied to fibers to improve their strength, may be removed by dipping the end portions of the fibers into acetone.

The etched end portions of fibers 24 and 26 may be secured together in side-by-side relationship by any suitable bonding material,or by fusing the end portions by applying heat thereto. An electrical discharge provided by an apparatus such as that disclosed in U.S. Pat. No. 3,960,531 issued June 1, 1976 to Y. Kohanzadeh et al. may be employed to fuse the fibers together. A miniature oxybutane torch may also be employed to provide localized heating to effect fusion of the fibers. A minimal amount of fusing will result in the securing of the fibers as shown in FIG. 2. Continuation of the fusing process for an additional period of time will result in the formation of a structure having a cross-section such as that illustrated in FIG. 3. After the fusing operation is completed, it may be necessary to provide the resultant structure with a planar, optical quality endface that is perpendicular to the fiber axes. A junction device in which the fibers are fused to the extent illustrated in FIG. 3 exhibits lower insertion loss than the device wherein the fibers 24 and 26 are merely secured in side-by-side relationship.

Figure 3:
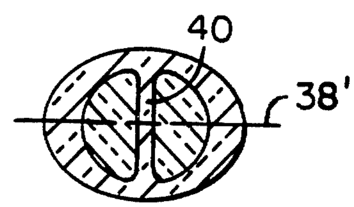
FIG. 3 is a cross-sectional view illustrating the securing of two fibers in side-by-side relationship by fusion.

To complete the optical junction device of the present invention means must be provided for causing relative movement between the endfaces 32 and 34 and endface 30. To maintain maximum efficiency, this movement should cause the center of endface 30 to traverse a line 38 which passes through the centers of endfaces 32 and 34. As illustrated in FIG. 3, the line 28' passes through the common cladding wall 40, and the core portion of each fiber endface is symmetrical about line 28'.

Figure 4:
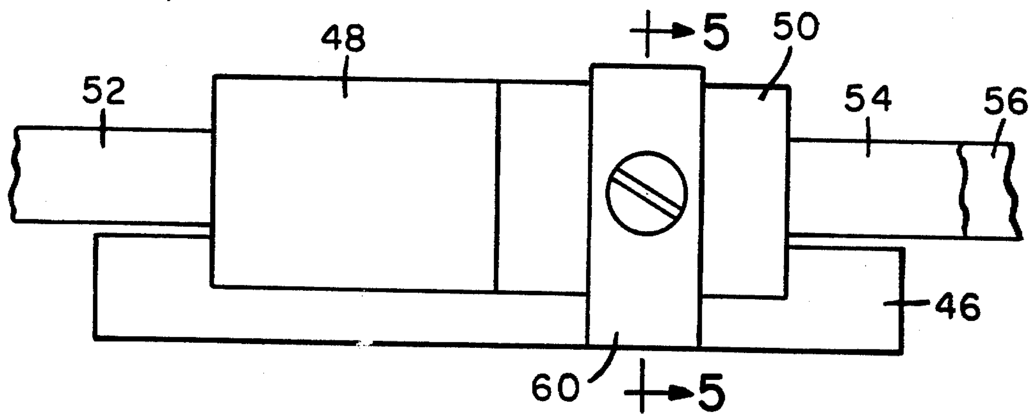
FIG. 4 is a side-elevational view of first embodiment of the present invention.
Figure 5:
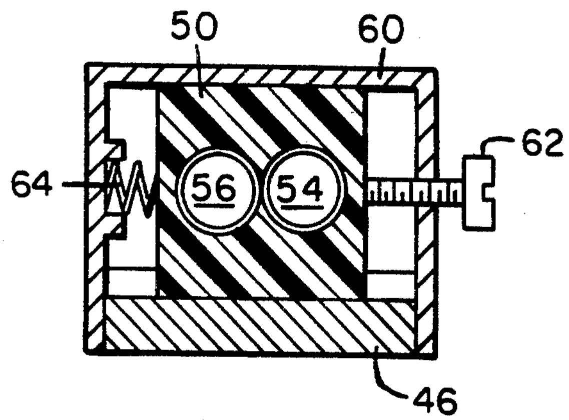
FIG. 5 is a cross-sectional view taken along lines 5—5 of FIG. 4.

A first embodiment for implementing the previously described principles of this invention is illustrated in FIGS. 4 and 5. A base member 46 supports two fiber termination devices 48 and 50. Termination device 48 is rigidly secured to base 46 whereas device 50 is slideably mounted on the base member. Fiber 52 is secured within device 48, and fibers 54 and 56 are secured within device 50 so that the endfaces of these fibers extend to the abutting surfaces of devices 48 and 50, respectively.

A bracket 60, which is secured to base member 46, supports an adjustment screw 62 and a biasing spring 64, which contact opposing surfaces of device 50. In this embodiment, the endface of fiber 52 is thus fixedly mounted with respect to base member 46. By turning screw 62, the endfaces of fibers 54 and 56 are caused to move relative to the endface of fiber 52 in the manner previously described in conjunction with FIG. 2. As screw 62 is withdrawn, spring 64 causes device 50 to move and maintain contact with the screw.

Since a portion of the cladding is removed from fibers 54 and 56, it is advantageous for fiber termination device 50 or at least that portion thereof which surrounds fibers 54 and 56 consist of a transparent materials such as plastic or glass having a refractive index lower than that of the fiber cores.

Figure 7:
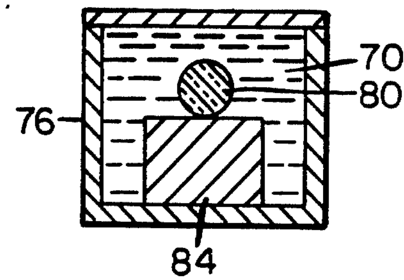
FIG. 7 is a cross-sectional view taken along lines 7—7 of FIG. 6.
Figure 6:
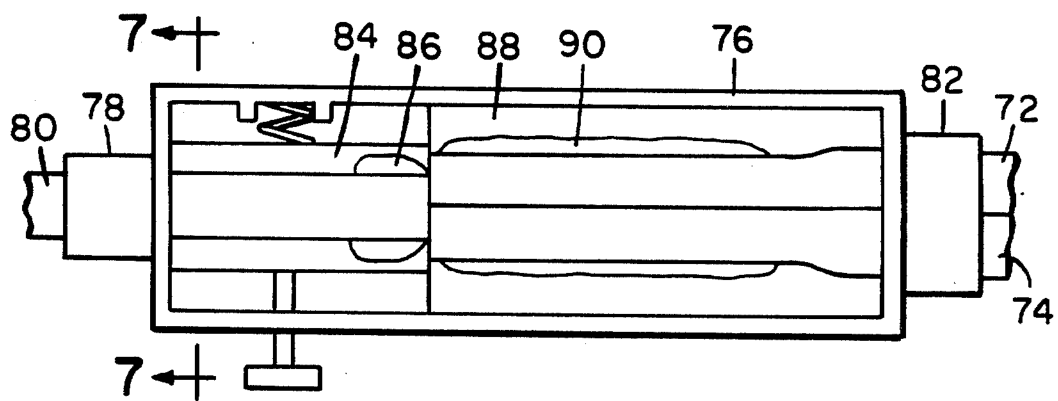
FIG. 6 is a plan view of another embodiment of this invention wherein the cover has been removed.

In the embodiment illustrated in FIGS. 6 and 7 the coupling region is enclosed in a chamber which is filled with index matching fluid 70 having a refractive index slightly lower than that of the fiber cores in order to maintain waveguiding in the end portions of fibers 72 and 74 which have had at least a portion of their cladding removed. Housing 76 is provided with fiber receiving apertures at opposite ends thereof. Flange 78 secures fiber 80 at a suitable distance from its endface, and flange 82 secures fibers 72 and 74 at a point along their length such that the etched portions thereof are disposed within the chamber. The end of fiber 80 is bonded to support block 84 by adhesive 86, and the end portions of fibers 72 and 74 are bonded to support block 88 by adhesive 90. In this embodiment, mechanical means similar to that of FIG. 5 are provided for moving fiber 80 relative to fibers 72 and 74. The presence of fluid 70 also minimized the Fresnel reflection losses encountered at the fiber interfaces and provides vibration dampening by virtue of its mass and viscosity Fibers having a core diameter of 85 μm were utilized in the construction of an optical junction device of the type described herein. The cladding was etched from two fibers until about 5 μm remained. The ends of the three fibers were broken by employing the aforementioned scribing and breaking procedure to achieve flat endfaces which were substantially perpendicular to the fiber axes. The two etched fibers were secured to a stationary block by cement in a side-by-side manner so that their endfaces were coplanar. The non-etched fiber was cemented to a movable block which could be moved laterally with respect to the stationary block with a micrometer. The two blocks were disposed in abutting relationship so that the endface of the non-etched fiber was positioned adjacent to the endfaces of the etched fibers. The coupling ratio f was varied from about 0.1 to about 0.9 and the insertion loss was measured. Losses of approximately 3dB were recorded, the minimum being 2.54 dB.

I claim:

1. An optical junction device comprising first, second and third optical fibers, each comprising a core of transparent material surrounded by a layer of transparent cladding material having a refractive index lower than that of said core material, the end portions of said first and second fibers being fused together in side-by-side relationship, said end portions of said first and second fibers being fused together to such an extent as to form a single composite fiber having two cores therein, the cladding layers of said first and second fibers combining to form a single cladding layer of elliptical cross section, the endfaces of said first and second fibers being substantially coplanar and being substantially perpendicular to the fiber axes, means for supporting the end portion of said third optical fiber so that its axis is substantially parallel with the axes of said first and second fibers and its endface is substantially perpendicular to the axis thereof and is disposed against the endfaces of said first and second fibers, and means for causing relative movement between the endfaces of said first and second fibers and said third fiber, said movement causing the center of said third fiber to traverse a line passing through the centers of the endfaces of said first and second fibers.

2. A device in accordance with claim 1 wherein at least a portion of the cladding layer is etched from the end portions of said first and second fibers.

3. A device in accordance with claim 2 wherein the etched end portions of said first and second fibers are immersed in index matching fluid having a refractive index lower than that of the cores of said fibers.

* * * * *